(12) United States Patent
Huber et al.

(10) Patent No.: US 11,454,390 B2
(45) Date of Patent: Sep. 27, 2022

(54) SPRAY HEADS FOR USE WITH DESUPERHEATERS AND DESUPERHEATERS INCLUDING SUCH SPRAY HEADS

(71) Applicant: FISHER CONTROLS INTERNATIONAL LLC, Marshalltown, IA (US)

(72) Inventors: Marc Oliver Huber, Windisch (CH); Kaspar Loeffel, Kuesnacht (CH); Thomas Duda, Dottikon (CH)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 16/702,114

(22) Filed: Dec. 3, 2019

(65) Prior Publication Data
US 2021/0164647 A1 Jun. 3, 2021

(51) Int. Cl.
*F22G 5/12* (2006.01)
*B33Y 10/00* (2015.01)

(52) U.S. Cl.
CPC .............. *F22G 5/123* (2013.01); *B33Y 10/00* (2014.12)

(58) Field of Classification Search
CPC ................................ F22G 5/123; B33Y 10/00
USPC .......................... 261/78.2, 115, 118, DIG. 13
See application file for complete search history.

(56) References Cited

U.S. PATENT DOCUMENTS

| | | | |
|---|---|---|---|
| 3,524,592 A | 8/1970 | Ulrik | |
| 4,130,611 A * | 12/1978 | Brand | B05B 1/1672 |
| | | | 122/487 |
| 4,442,047 A * | 4/1984 | Johnson | B01F 5/045 |
| | | | 137/897 |
| 4,909,445 A | 3/1990 | Schoonover | |
| 5,290,486 A | 3/1994 | Enarson | |
| 5,439,619 A * | 8/1995 | Kuffer | F16K 1/221 |
| | | | 261/41.4 |

(Continued)

FOREIGN PATENT DOCUMENTS

| | | | |
|---|---|---|---|
| AT | 400616 B | * | 2/1996 |
| AT | 400616 B | | 2/1996 |

(Continued)

OTHER PUBLICATIONS

Huber, "Additively Manufactured Sprayhead for a Desuperheater," Master of Science in Engineering. Publically available May 2019.

(Continued)

*Primary Examiner* — Charles S Bushey
(74) *Attorney, Agent, or Firm* — Marshall, Gerstein & Borun LLP

(57) ABSTRACT

Spray heads for use with desuperheaters and desuperheaters including such spray heads. In accordance with an example, a spray head for a desuperheater includes a main body having a first end portion arranged for attachment to a flow line, a second end portion, and a passage that extends between the first end portion and the second end portion and defines an entrance port. The passage being adapted for connection to a source of fluid. The main body includes an outer portion having an irregular external shape and including a spray nozzle having an exit opening defined by the outer portion. A flow passage is coupled between the entrance port and the spray nozzle.

21 Claims, 12 Drawing Sheets

(56) References Cited

U.S. PATENT DOCUMENTS

| | | | |
|---|---|---|---|
| 5,607,626 A * | 3/1997 | Kunkle | F22G 5/123 |
| | | | 261/27 |
| 6,746,001 B1 | 6/2004 | Sherikar | |
| 8,333,329 B2 | 12/2012 | Ignatan et al. | |
| 9,492,829 B2 | 11/2016 | Mastrovito | |
| 10,443,837 B2 | 10/2019 | Strebe | |
| 2009/0174087 A1 | 7/2009 | Bauer | |
| 2009/0256007 A1 | 10/2009 | McMasters et al. | |
| 2012/0017852 A1 | 1/2012 | Geelhart et al. | |
| 2016/0033124 A1 | 2/2016 | Giove et al. | |
| 2020/0149737 A1* | 5/2020 | Huber | B05B 7/06 |
| 2020/0173652 A1* | 6/2020 | Huber | F22G 5/123 |

FOREIGN PATENT DOCUMENTS

| | | | |
|---|---|---|---|
| AT | 404176 B * | 9/1998 | |
| AT | 404176 B | 9/1998 | |
| DE | 3415086 C1 | 11/1985 | |
| DE | 198 30 244 C2 | 5/2000 | |
| DE | 198 30 244 C2 * | 5/2000 | |
| DE | 202010009860 U1 | 10/2011 | |
| EP | 0 481 573 A1 | 4/1992 | |
| EP | 0481573 A1 | 4/1992 | |
| EP | 0 971 168 A2 | 1/2000 | |
| EP | 1 965 132 A1 | 9/2008 | |
| EP | 1965132 A1 | 9/2008 | |
| EP | 2 405 195 A2 | 1/2012 | |
| EP | 2405195 A2 | 1/2012 | |
| JP | 2015-190757 A | 11/2015 | |
| JP | 2015190757 A | 11/2015 | |
| KR | 19980023165 U | 7/1998 | |
| NL | 9201491 * | 3/1994 | |
| NL | 9201491 A | 3/1994 | |
| NL | 9301125 * | 1/1995 | |
| NL | 9301125 A | 1/1995 | |
| WO | WO-83/03365 A1 | 10/1983 | |
| WO | WO-9808025 A1 | 2/1998 | |

OTHER PUBLICATIONS

International Search Report and Written Opinion for PCT/US2019/059958, dated Apr. 24, 2020.

* cited by examiner

SPRAY HEADS FOR USE WITH DESUPERHEATERS AND DESUPERHEATERS INCLUDING SUCH SPRAY HEADS

FIELD OF THE DISCLOSURE

The present patent relates generally to spray heads and, in particular, to spray heads for use with desuperheaters and desuperheaters including such spray heads.

BACKGROUND

Steam supply systems typically produce or generate superheated steam having relatively high temperatures (e.g., temperatures greater than the saturation temperatures) greater than maximum allowable operating temperatures of downstream equipment. In some instances, superheated steam having a temperature greater than the maximum allowable operating temperature of the downstream equipment may damage the downstream equipment.

Thus, a steam supply system typically employs a desuperheater to reduce the temperature of the steam downstream from the desuperheater. Some known desuperheaters (e.g., insertion-style desuperheaters) include a body portion that is suspended or disposed substantially perpendicular to a fluid flow path of the steam flowing in a passageway (e.g., a pipeline). The desuperheater includes a spray head having a nozzle that injects or sprays cooling water into the steam flow to reduce the temperature of the steam flowing downstream from the desuperheater.

FIG. 1 illustrates one example of a known desuperheater 104 coupled to a flow line 102 through which steam flows. The desuperheater 104 is coupled to the flow line 102 via a flanged connection 105 including opposing flanges 106, 107. As shown, the desuperheater 104 includes a desuperheater body 110 and a spray head 108 coupled to the desuperheater body 110 and having a nozzle 112 extending from the desuperheater body 110. It will be appreciated that each of these parts of the desuperheater 104 are separately produced using conventional manufacturing techniques and then assembled together.

To decrease the temperature of the steam within the flow line 102, the nozzle 112 of the desuperheater 104 is positioned to emit spray water 114 into the flow line 102 via a linear flow passage that provides fluid communication between (i) a port formed in the spray head 108 and adapted for connection to a source of spray water and (ii) the nozzle 112. In operation, a temperature sensor 116 provides temperature values of the steam within the flow line 102 to a controller 118. The controller 118 is coupled to a control valve assembly 120 including an actuator 122 and a valve 124. When the temperature value of the steam within the flow line 102 is greater than a set point, the controller 118 causes the actuator 122 to open the valve 124 to enable the spray water 114 to flow through the control valve assembly 120, to and out of the nozzle 112, and into the flow line 102.

SUMMARY

In accordance with a first example, a spray head for a desuperheater includes a main body having a first end portion arranged for attachment to a flow line, a second end portion spaced away from the first end portion, and an internal passage. The internal passage is arranged for connection to a fluid source. The internal passage includes an internal surface having a plurality of entrance ports. The main body includes an outer portion and includes a plurality of spray nozzles. Each of the plurality of spray nozzles includes an exit port. A plurality of flow passages extend between the internal surface and the outer portion. Each of the plurality of flow passages fluidly couples a corresponding one of the plurality of entrance ports to a corresponding exit port of a corresponding one of the plurality of spray nozzles. Each of the spray nozzles are carried by outwardly extending projections that extend away from a longitudinal axis of the main body.

In accordance with a second example, a spray head for a desuperheater includes a main body having a first end portion arranged for attachment to a flow line, a second end portion, and a passage that extends between the first end portion and the second end portion and defines an entrance port. The passage being adapted for connection to a source of fluid. The main body includes an outer portion having an irregular external shape and including a spray nozzle having an exit opening defined by the outer portion. A flow passage is coupled between the entrance port and the spray nozzle.

In accordance with a third example, a method of manufacturing includes creating a spray head for a desuperheater using an additive manufacturing technique. The creating includes forming a main body having a first end portion arranged for attachment to a flow line, a second end portion spaced away from the first end portion, and an internal passage. The internal passage is arranged for connection to a fluid source. The method includes forming the internal passage including an internal surface having a plurality of entrance ports and forming the main body including an outer portion and including a plurality of spray nozzles. Each of the plurality of spray nozzles includes an exit port. The method includes forming a plurality of flow passages extending between the internal surface and the outer portion. Each of the plurality of flow passages fluidly couples a corresponding one of the plurality of entrance ports to a corresponding exit port of a corresponding one of the plurality of spray nozzles. Each of the spray nozzles are carried by outwardly extending projections that extend away from a longitudinal axis of the main body.

In accordance with a fourth example, a spray head for a desuperheater includes a main body having a first end portion, a second end portion, a lobed downstream surface, and an internal portion. The internal portion defines a passage that extends between the first end portion and the second end portion. The passage is adapted for connection to a source of fluid. A plurality of entrance ports are formed through the internal portion and are connected to the passage. The spray head includes a plurality of spray nozzles having corresponding exit openings. At least some of the exit openings are formed by the lobed downstream surface. The spray head includes a plurality of flow passages. Each flow passage is coupled between one of the entrance ports and a corresponding spray nozzle.

In accordance with a fifth example, a spray head for a desuperheater includes a main body having a first end portion, a second end portion, a lobed downstream surface, and a passage that extends between the first end portion and the second end portion and defines an entrance port. The passage is adapted for connection to a source of fluid. The spray head also includes a spray nozzle having an exit opening defined by the lobed downstream surface and a flow passage coupled between the entrance port and the spray nozzle.

In accordance with a sixth example, an apparatus includes a method of manufacturing includes creating a spray head for a desuperheater using an additive manufacturing technique, the creating comprising: forming a main body having a first end portion, a second end portion, a lobed downstream surface, and an internal portion. The internal portion defines a passage that extends between the first end portion and the second end portion. The creating includes forming a plurality of entrance ports through the internal portion and connected to the passage. The creating includes forming a plurality of spray nozzles having corresponding exit openings. At least some of the exit openings is formed by the lobed downstream surface. The creating includes forming a plurality of flow passages. Each flow passage is coupled between one of the entrance ports and a corresponding spray nozzle.

In further accordance with the foregoing first, second, third, fourth, fifth, and/or sixth examples, an apparatus and/or method may further include any one or more of the following:

In accordance with one example, a first one of the exit openings is oriented along a first axis and at a first angle relative to the longitudinal axis, and a second one of the exit openings is oriented along a second axis at an angle relative to the first axis and at a second angle relative to the longitudinal axis, the first and second angles being different from one another.

In accordance with another example, a first one of the exit openings is oriented along a first axis and parallel to the longitudinal axis.

In accordance with another example, the main body includes an upstream side and a downstream side. A majority of the spray nozzles are disposed adjacent the downstream side.

In accordance with another example, at least some of the entrance ports are positioned adjacent the upstream side.

In accordance with another example, the main body includes an upstream side and a downstream side. A first one of the entrance ports is adjacent the upstream side and the corresponding exit port is adjacent the downstream side.

In accordance with another example, the entrance port is positioned adjacent the first end portion and a corresponding spray nozzle is positioned adjacent the second end portion.

In accordance with another example, the outer portion surrounds the internal passage, and the flow passages are disposed between the outer portion and the internal passage.

In accordance with another example, an internal space is formed by the outer portion and the flow passages are positioned within the internal space.

In accordance with another example, the outer portion defines a through hole fluidly coupling the internal space to an external environment.

In accordance with another example, further including a support coupled between the internal passage and an internal surface of the outer portion.

In accordance with another example, an entrance port is coupled to a spray head adapted to spray a first volume of the fluid is positioned closer to the second end portion and an entrance port coupled to a spray head adapted to spray a second volume of the fluid is positioned closer to the first end portion. The first volume is greater than the second volume.

In accordance with another example, the main body has an upstream side and a downstream side. The entrance port is positioned on the upstream side of the main body.

In accordance with another example, the main body includes an upstream side and a downstream side. A majority of the spray nozzles are disposed adjacent the downstream side.

In accordance with another example, the main body, the spray nozzle, and the flow passage are integrally formed.

In accordance with another example, the main body has a curved upstream surface that is contiguous with the outer portion having the irregular external shape.

In accordance with another example, the outer portion includes an outer wall.

In accordance with another example, a first one of the exit openings is oriented along a first axis and at a first angle relative to the longitudinal axis, and a second one of the exit openings is oriented along a second axis at an angle relative to the first axis and at a second angle relative to the longitudinal axis, the first and second angles being different from one another.

DETAILED DESCRIPTION

Although the following text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

Figure 1:
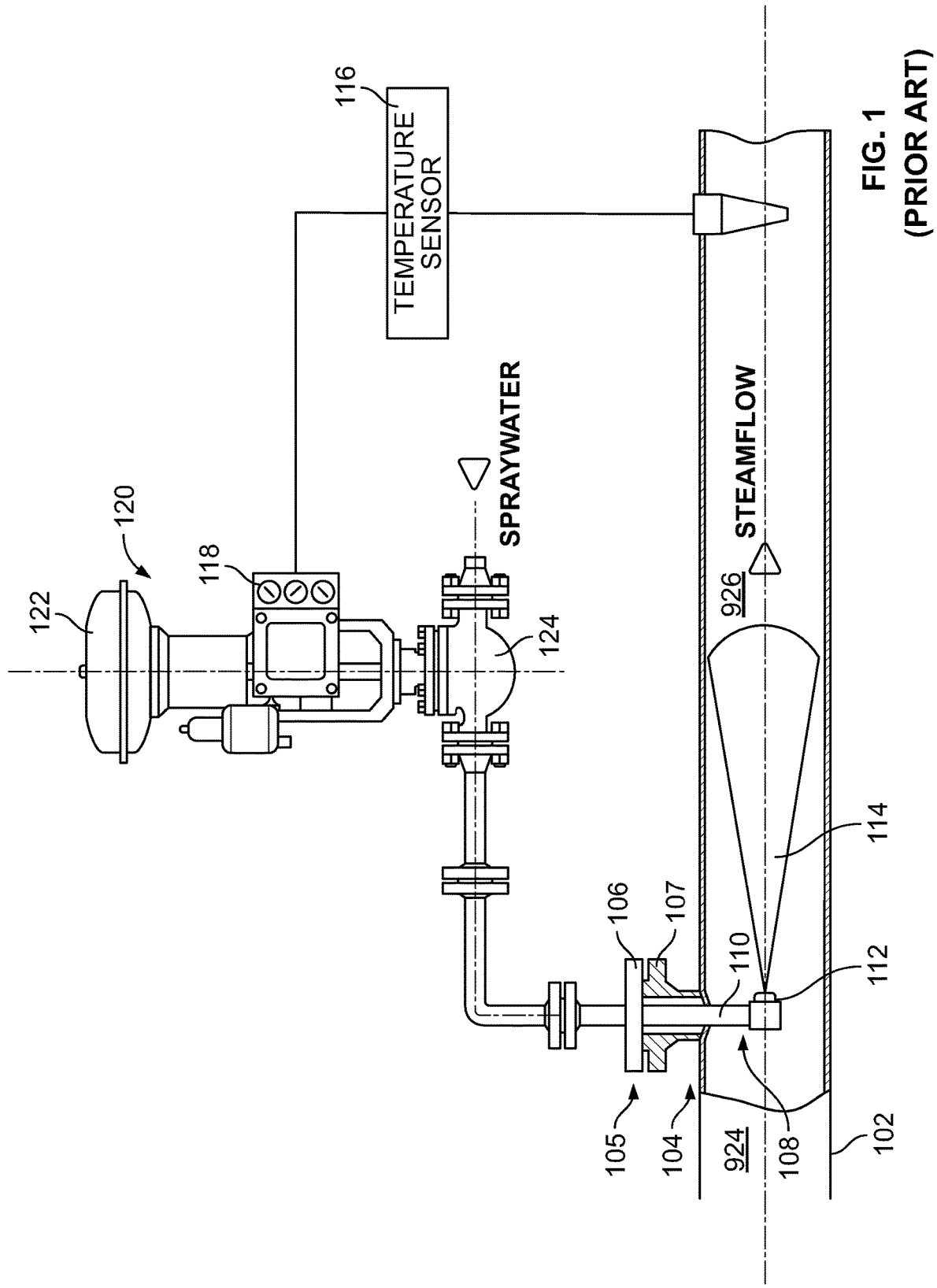
FIG. 1 illustrates a known desuperheater coupled to a flow line through which steam flows.

FIGS. 2-5 illustrate one example of a spray head 200 for a desuperheater that is constructed in accordance with a first disclosed example of the present invention. As discussed herein, the spray head 200 may be used in the desuperheater 104 in place of the spray head 108 of FIG. 1, though it will be appreciated that the spray head 200 can be used in other desuperheaters (or in connection with other flow lines). In the illustrated example, the spray head 200 is formed of a main body 204, a plurality of entrance ports 208 formed in the main body 204, and a plurality of spray nozzles 212A-212J having a plurality of flow passages 216A-216J, with each of these components integrally formed with one another to form a unitary spray head. In other examples, however, the spray head 200 can vary. As an example, the spray head 200 can instead include a different number of entrance ports 208 (e.g., only one entrance port 208) and/or a different number of spray nozzles.

The main body 204 is generally adapted to be connected to a source of fluid (not shown) for reducing the temperature of the steam flowing through the flow line 102 (or any other similar line). The main body 204 has a first end 220 and a second end 224 opposite the first end 220. Between the first end 220 and the second end 224, the main body 204 includes a collar 228 arranged at or proximate the first end 220 and an elongated portion 236 arranged between the collar 228 and the second end 224. The collar 228 is generally arranged to be coupled to the flange 106 when the spray head 200 is used in the desuperheater 104. The collar 228 can, but need not, include threads for threadably engaging the flange 106. Meanwhile, at least a substantial portion of the elongated portion 236 is arranged to be positioned within the flow line 102 when the spray head 200 is used in the desuperheater 104. The main body 204 also includes an outer wall 237 (partially removed in FIGS. 3-5 in order to illustrate other features of the spray head 200) and an inner wall 238 spaced radially inwardly of the outer wall 237. The inner wall 238 defines a central passage 240 that extends along a longitudinal axis 244 of the main body 204 between the first and second ends 220, 224.

Figure 3:
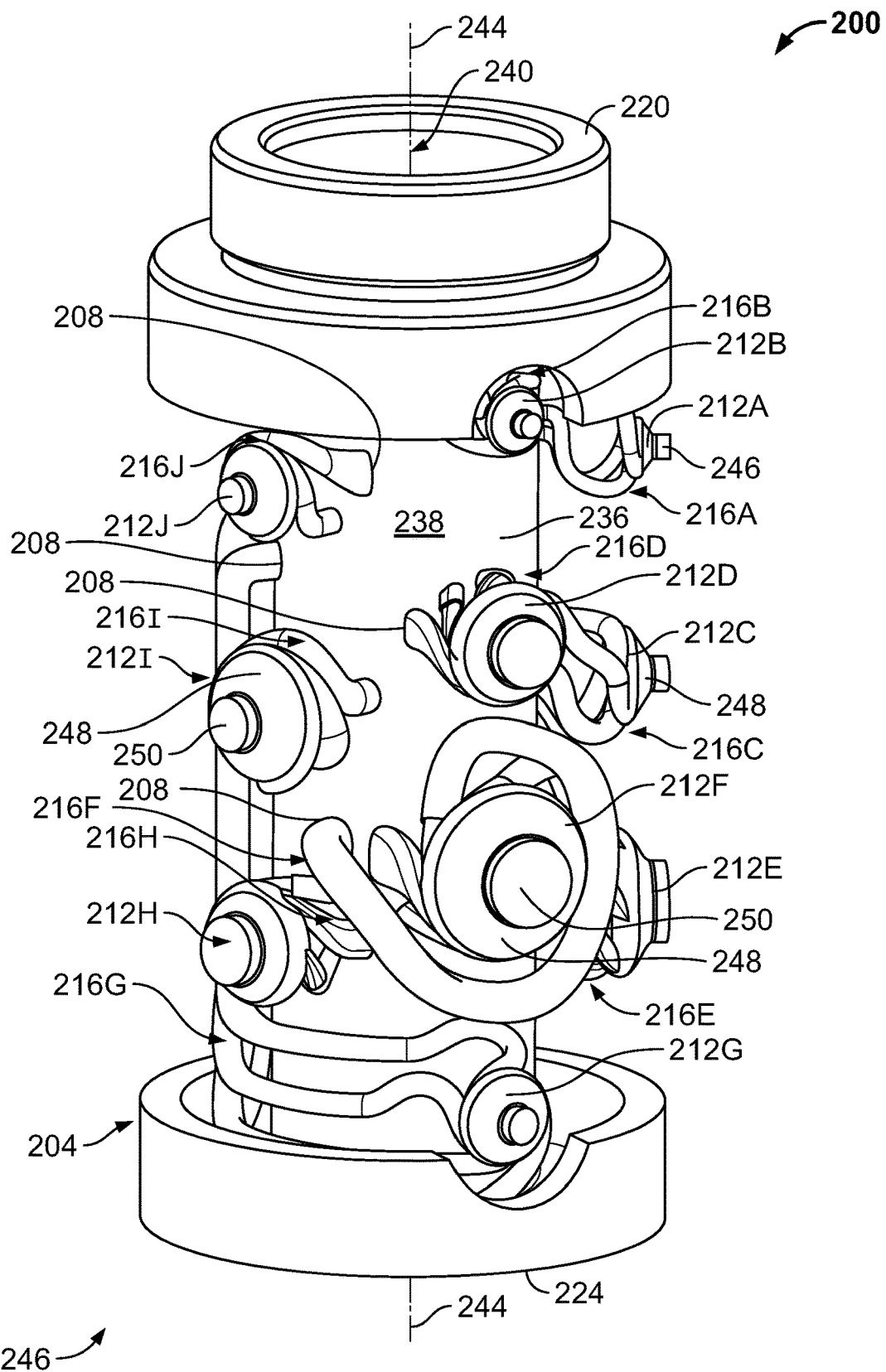
FIG. 3 is similar to FIG. 2, but with a portion of the spray head removed and hollow components of the spray head shown in outline for illustrative purposes.
Figure 4:
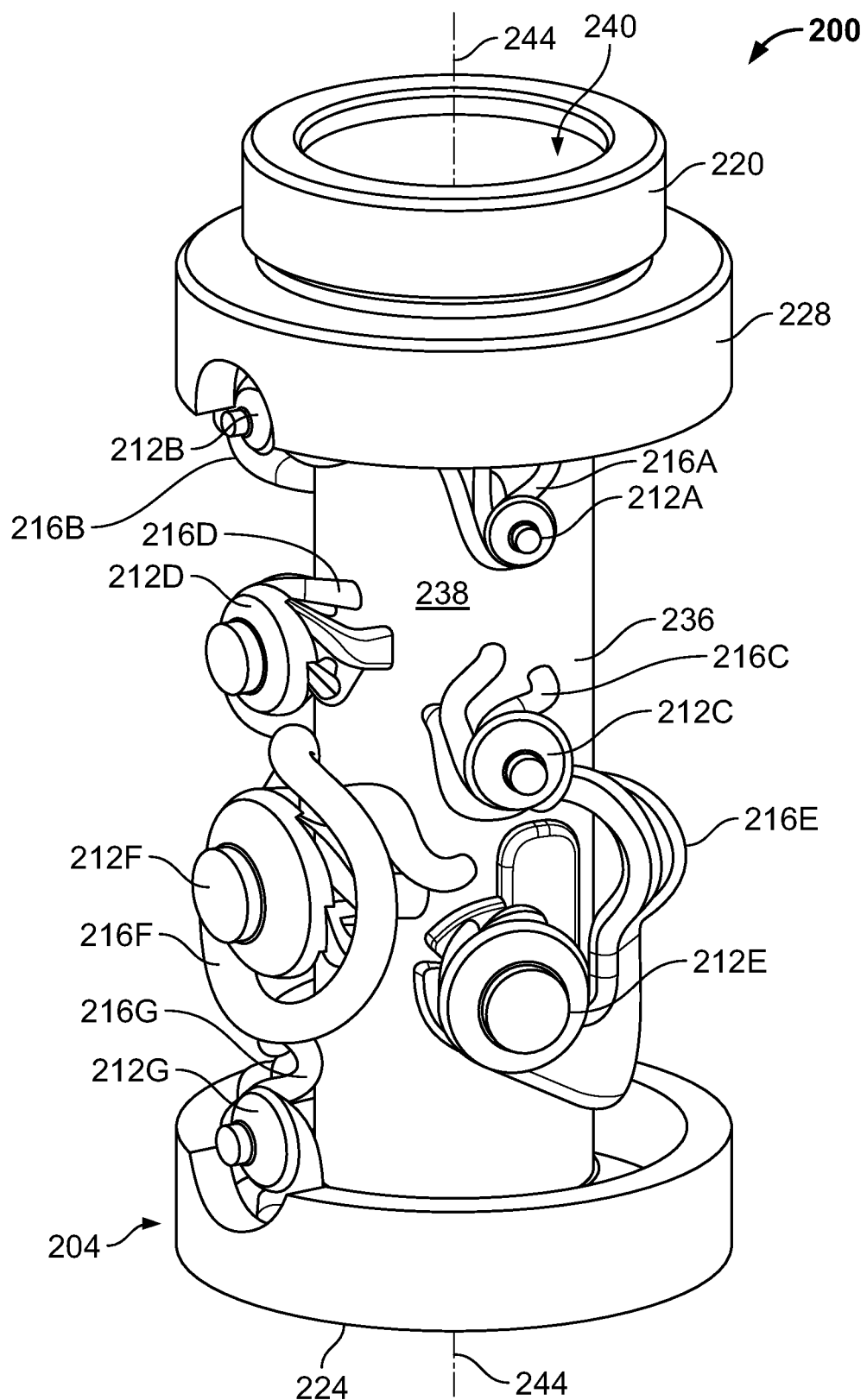
FIG. 4 is another isometric view of the spray head of FIG. 3.

As best shown in FIGS. 3 and 4, the entrance ports 208 are formed in the main body 204, particularly in the inner wall 238, along the central passage 240 (i.e., between the first and second ends 220, 224). The entrance ports 208 are generally circumferentially arranged about the central passage 240 such that the entrance ports 208 are radially spaced from one another and spaced from one another along the longitudinal axis 244, though two or more of the entrance ports 208 may be radially aligned with one another and/or longitudinally aligned with one another. In any case, so formed, the entrance ports 208 are in fluid communication with fluid supplied by the source and flowing through the central passage 240.

Figure 2:
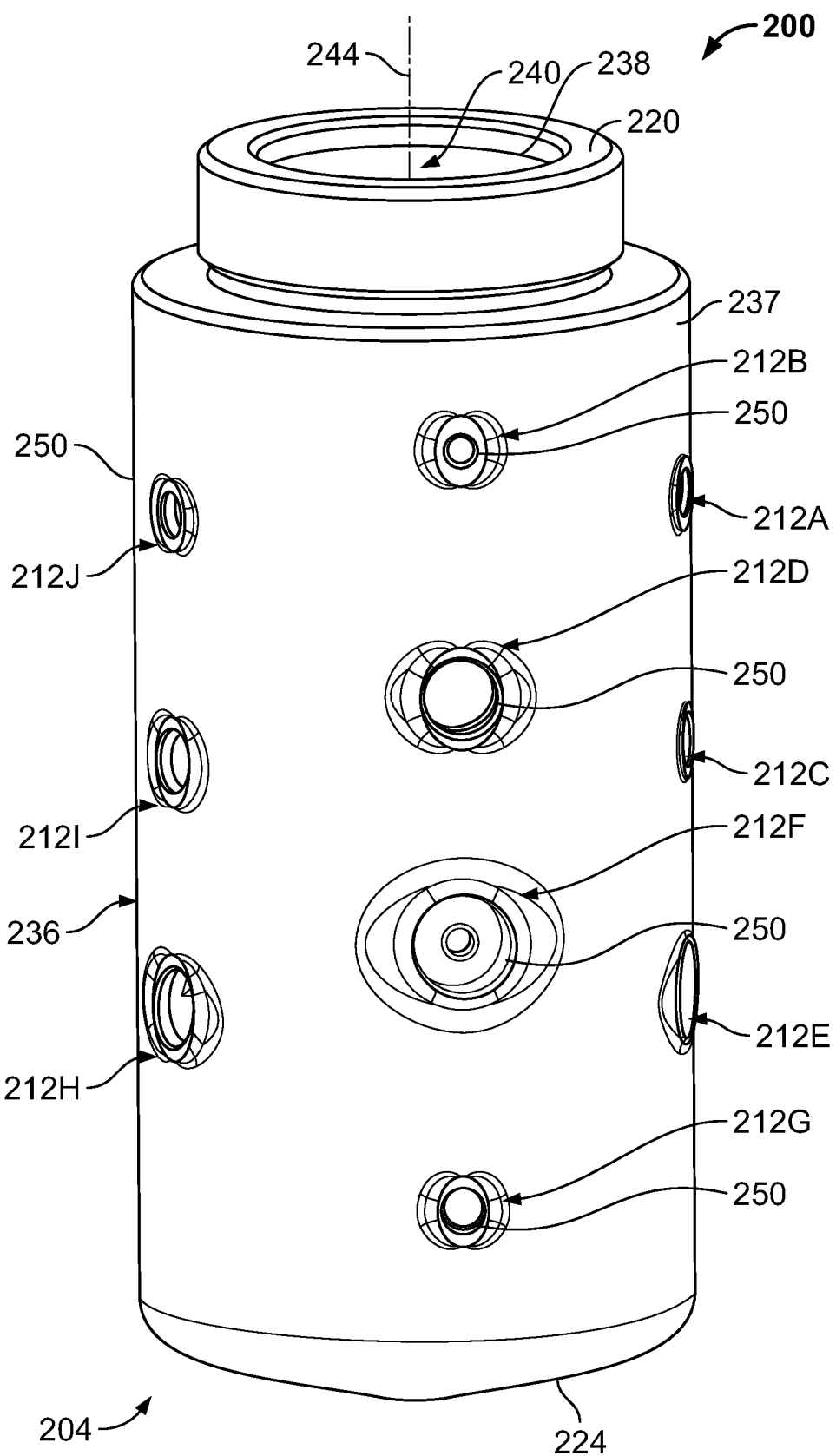
FIG. 2 is an isometric view of an example spray head that is constructed in accordance with a first disclosed example of the present invention and can be used in a desuperheater that is coupled to the flow line of FIG. 1.

The nozzles 212A-212J are hollow components that are integrally formed in the main body 204 when the spray head 200 is manufactured. As illustrated in FIG. 2, which illustrates the nozzles 212A-212J as seen from outside of the spray head 200, and FIGS. 3 and 4, wherein portions of the main body 204 are removed to show the nozzles 212A-212J in outline for illustration purposes, the nozzles 212A-212J are generally arranged adjacent the outer wall 237 of the main body 204 between the first and second ends 220, 224. In particular, the nozzles 212A-212J are arranged such that a substantial portion of each of the nozzles 212A-212J is disposed between the outer and inner walls 237, 238, and the remaining portion of each of the nozzles 212A-212J is disposed radially outward of the outer wall 237. In other words, a portion of each of the nozzles 212A-212J projects radially outwardly from the outer wall 237 of the main body 204. In other cases, however, one or more of the nozzles 212A-212J may be wholly disposed between the outer and inner walls 237, 238. As with the entrance ports 208, the nozzles 212A-212J are generally circumferentially arranged about the central passage 240 such that the nozzles 212A-212J are radially spaced from one another and longitudinally spaced from one another (i.e., spaced from one another along the longitudinal axis 244). Thus, as an example, the nozzle 212A is radially spaced from the nozzle 212B (i.e., the nozzle 212A is rotated about the longitudinal axis 244 relative to the nozzle 212B) and the nozzle 212A is positioned closer to the second end 224 than the nozzle 212B.

Generally speaking, each of the nozzles 212A-212J includes a nozzle body 246, at least one chamber 248 formed in the nozzle body 246, and at least one exit opening 250 that is formed in the nozzle body 246, in fluid communication with the at least one chamber 248, and arranged to provide the fluid supplied by the source to the flow line 102. The nozzle body 246 is integrally formed with the main body 204, such that the nozzle body 246 is not separately viewable in any of FIGS. 2-5. In the spray head 200 illustrated in FIGS. 2-5, each of the nozzles 212A-212J includes only one chamber 248, though in other examples, one or more nozzles 212A-212J can include more than one chamber 248.

Figure 5:
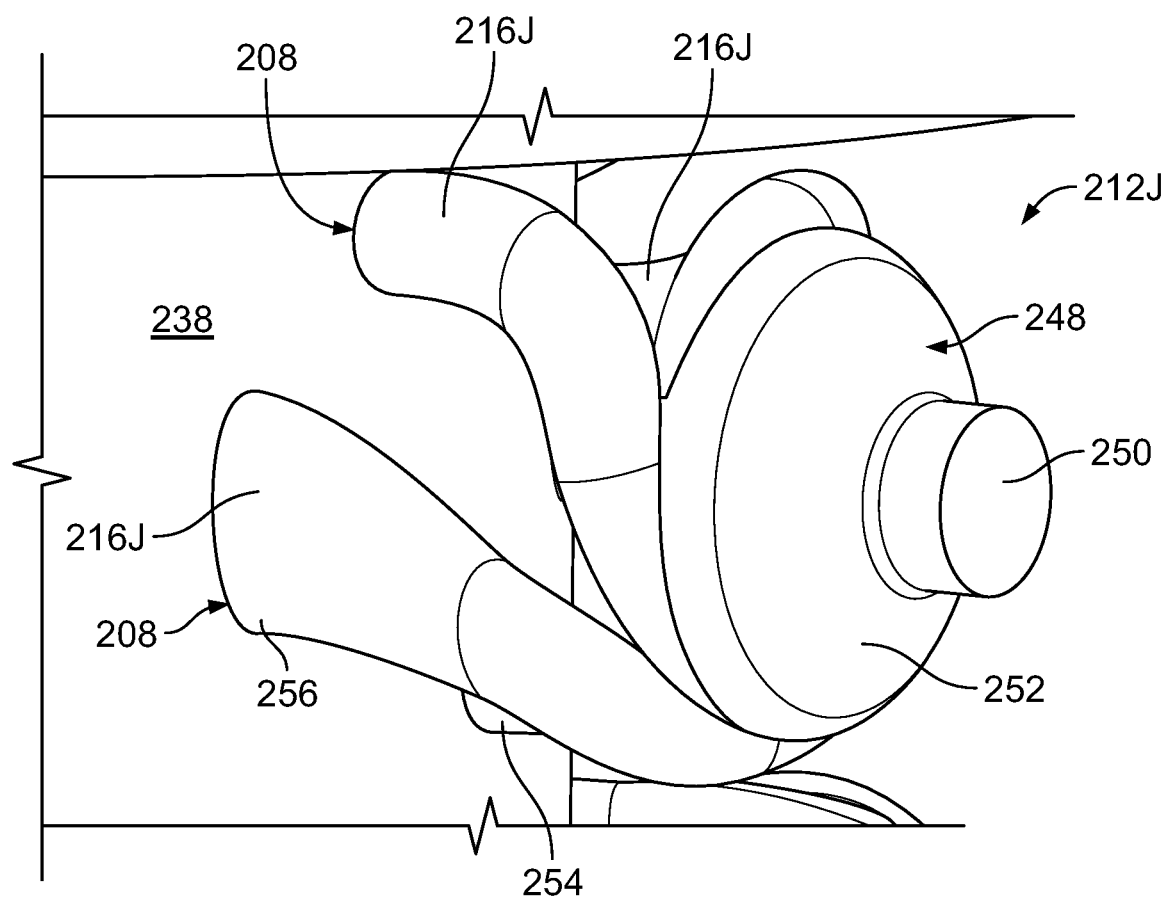
FIG. 5 is a close-up view of a portion of the spray head of FIGS. 3 and 4.

As best illustrated in FIG. 5, which depicts the nozzle 212J in greater detail, each chamber 248 preferably takes the form of a swirl chamber that is defined by a conical surface 252 of the nozzle 212J, which causes the fluid flowing through and out of the respective nozzle 212A-212J (via the exit opening 250) to swirl (i.e., travel in a helical path), which in turn encourages thorough and uniform mixing between the fluid dispensed by the spray head 200 and the steam flowing through the flow line 102. However, in other examples, one or more of the chambers 248 may be a different type of chamber. As an example, one or more of the chambers 248 may be a cylindrical chamber. In the spray head 200 illustrated in FIGS. 2-5, each of the nozzles 212A-212J also includes only one exit opening, though in other examples, one or more of the nozzles 212A-212J can include more than one exit opening. Each exit opening 250 preferably has a circular shape in cross-section, though other cross-sectional shapes (e.g., an oval-shape) can be used instead.

As best illustrated in FIGS. 2-5, the plurality of flow passages 216A-216J are formed in the nozzle body 246 and provide fluid communication between the entrance ports 208 and the exit opening 250 of the nozzles 212A-212J, respectively. In particular, each of the flow passages 216A-216J has (i) an inlet in fluid communication with a respective one of the entrance ports 208, (ii) an outlet that feeds into and is in fluid communication with the at least one chamber 248 of a respective one of the nozzles 212A-212J, which is in turn in fluid communication with the at least one exit opening 250 associated with that at least one chamber 248, and (iii) an intermediate portion between the inlet and the outlet. In some cases, multiple flow passages provide fluid communication between the same or different entrance ports 208 and the same exit opening 250 of one of the nozzles 212A-212J. As an example, multiple flow passages 216A each independently fluidly connect the same entrance port 208 with the exit opening 250 of the nozzle 212A (via the chamber 248 of that nozzle 212A), such that fluid independently flows through the nozzle 212A via the multiple different flow passages 216A. As such, the spray head 200 need not include a feed chamber, as is included with some known spray heads, thereby reducing the footprint of the spray head 200. In other cases, however, only one flow passage may be used to provide fluid communication between one of the entrance ports 208 and the exit opening 250 of one of the nozzles 212A-212J.

Moreover, at least some of the flow passages 216A-216J have a non-uniform, or variable, cross-section as well as different lengths. As illustrated in FIGS. 3 and 5, for example, the flow passages 216J, which each provide fluid communication between respective entrance ports 208 and the exit opening 250 of the nozzle 212J, have non-uniform cross-sections and different lengths than one another. For example, one of the flow passages 216J has a first diameter at portion 254 and a second diameter at portion 258 that is larger than the first diameter. In turn, these flow passages 216J affect the pressure of fluid flowing therethrough in different ways. In most cases, these flow passages 216J will reduce the pressure of fluid flowing therethrough at different rates, such that one or more of the flow passages 216J provides fluid to the exit opening 250 of the nozzle 212J at a first pressure and one or more of the flow passages 216J provides fluid to the exit opening 250 of the nozzle 212J at a second pressure, which is different from the first pressure when the inlet of one or more of the flow passages 216J is partially opened. Additionally, at least some of the flow passages 216A-216J have a component that is parallel to the longitudinal axis 244 and another component that is perpendicular to the longitudinal axis 244, such that different levels of pressure reduction can be achieved, all without adding to the footprint of the spray head 200. Further yet, each of the flow passages 216A-216J follows a non-linear, and, in many cases, a convoluted, path, e.g., a helical or other free-form path. For example, as illustrated in FIGS. 3 and 4, each of the flow passages 216G follows a convoluted path, with the inlet of each of the flow passages positioned at a respective entrance port 208 positioned adjacent to the first end 220 of the main body 204, the intermediate portion extending away from the inlet in a longitudinal direction along the inner wall 238 and in a radial direction along the inner wall 238, before curving radially outward toward the chamber 248 of the nozzle 212G and feeding into the outlet positioned adjacent the second end 224 of the main body 204. At the same time, each of the flow passages 216A-216J provides a relatively smooth transition from the outlet to the chamber 248 of the respective spray nozzle.

Figure 6:
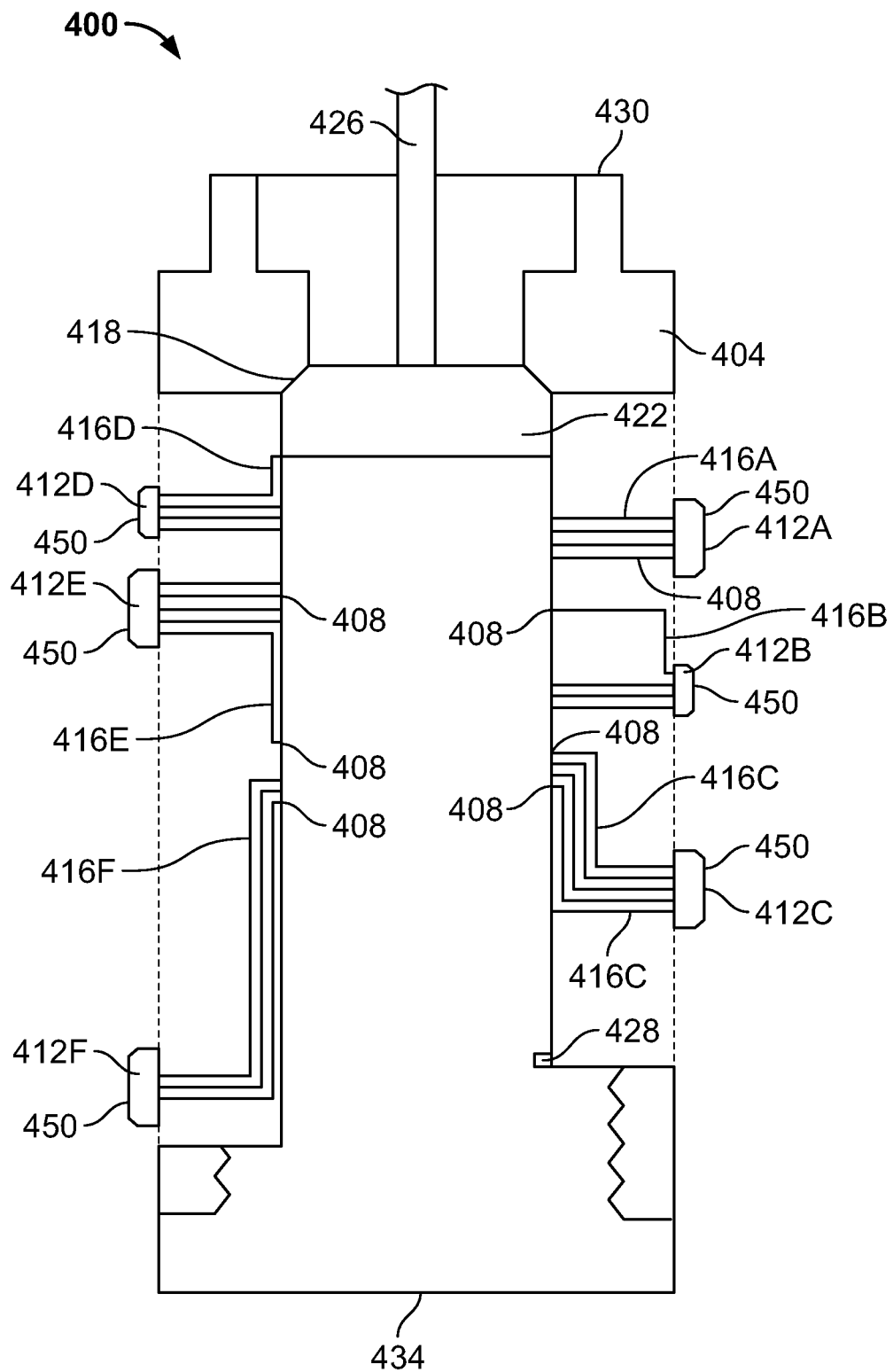
FIG. 6 is a schematic cross-sectional view of another example spray head that is constructed in accordance with a second disclosed example of the present invention and can be used in a desuperheater that is coupled to the flow line of FIG. 1.

FIG. 6 illustrates another example of a spray head 400 constructed in accordance with a second disclosed example of the present invention. The spray head 400 may be used with the desuperheater 104 of FIG. 1 in place of the spray head 108 or in connection with other desuperheaters or other flow lines. The spray head 400 is similar to the spray head 200, in that the spray head 400 similarly includes a main body 404, a plurality of entrance ports 408 formed in the main body 404, a plurality of spray nozzles 412A-412F formed in the main body 404 and having a plurality of flow passages 416A-416F that provide fluid communication between a respective one of the entrance ports 408 and an exit opening 450 of a respective one of the flow passages 416A-416F, with each of these components integrally formed with one another to form a unitary spray head. However, unlike the spray head 200, the spray head 400 also includes a valve seat 418, a fluid flow control member 422, and a valve stem 426 that operatively couples an actuator (not shown) to the fluid flow control member 422 for controlling the position of the fluid flow control member 422.

The valve seat 418 is generally coupled to the main body 404. In this example, the valve seat 418 is integrally formed within the main body 404 at a position proximate to a first end 430 of the main body 404. In other examples, however, the valve seat 418 can be removably coupled to the main body 404 and/or positioned elsewhere within the main body 404. The fluid flow control member 422, which in this example takes the form of a valve plug, is movably disposed within the main body 404 relative to the valve seat 418 to control the flow of fluid into the spray head 400. In particular, the fluid flow control member 422 is movable between a first position, in which the fluid flow control member 422 sealingly engages the valve seat 418, and a second position, in which the fluid flow control member 422 is spaced from the valve seat 418 and engages a travel stop 428 positioned in the main body 404. It will be appreciated that in the first position, the fluid flow control member 422 prevents fluid from the source of fluid from flowing into the spray head 400 (via the first end 430), which also serves to prevent the spray nozzles 412A-412F from emitting the fluid into the flow line 102. Conversely, in the second position, the fluid flow control member 422 allows fluid from the source of fluid to flow into the spray head 400, such that the spray nozzles 412A-412F can in turn emit the fluid into the flow line 102.

It will also be appreciated that the spray nozzles 412A-412F are positioned at different locations between the first end 430 of the main body 404 and a second end 434 of the main body 404 opposite the first end 430. As illustrated in FIG. 6, for example, the spray nozzle 412A is positioned closer to the first end 430 than the spray nozzle 412B, and the spray nozzle 412B is positioned closer to the first end 430 than the spray nozzle 412C. As a result of this arrangement, the spray nozzles 412A-412F are exposed (i.e., opened) or blocked (i.e., closed) at different times as the fluid flow control member 422 moves between its first and second positions. In particular, as the fluid flow control member 422 moves from the first position to the second position, exposing the spray nozzle 412D, then exposing the spray nozzle 412A, and so on, the fluid will flow into and out of the spray nozzle 412D (via the flow passages 416D), then into and out of the spray nozzle 412A (via the flow passages 416A), and so on. By exposing (or blocking) the spray nozzles 412A-412F sequentially, one after another, the spray head 400 provides for a better, more consistent distribution of the fluid within the flow line 102 than the fluid distribution provided by known spray heads.

Figure 7:
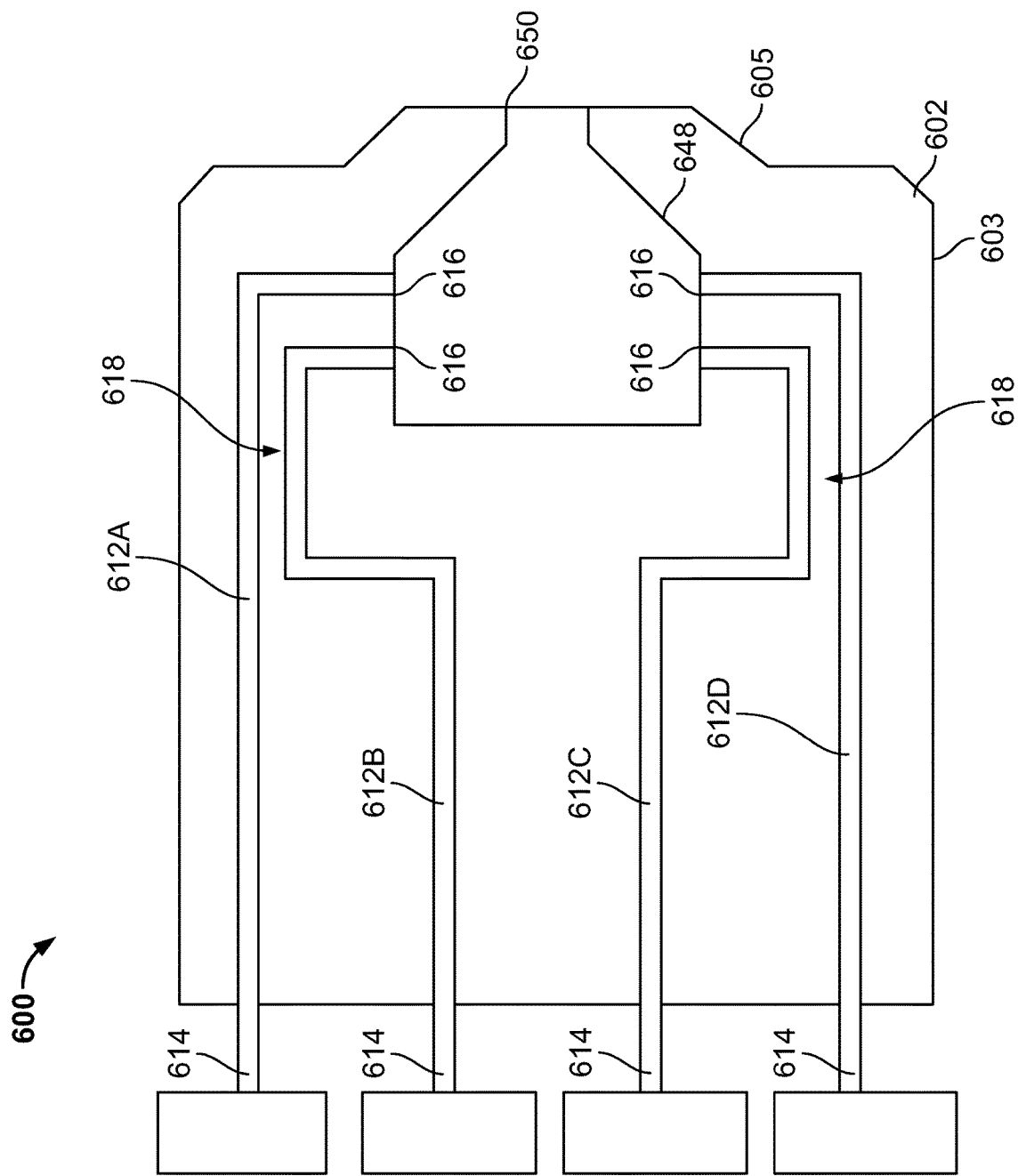
FIG. 7 is a cross-sectional view of another example of a nozzle constructed in accordance with a third disclosed example of the present invention.

FIG. 7 illustrates an example of a spray nozzle 600 that is constructed in accordance with a third example of the present invention. The spray nozzle 600 may be employed in the spray head 200, the spray head 400, the spray head 900 (FIG. 9) or another spray head. The spray nozzle 600 in this example includes a nozzle body 602, a plurality of flow passages 612A-612D formed in the nozzle body 602, a single chamber 648, similar to the chamber 248, formed in the nozzle body 602, and an exit opening 650 formed in the nozzle body 602. The nozzle body 602 has a substantially cylindrical shape defined by a cylindrical portion 603 and a frustoconical portion 605 extending outward from the cylindrical portion 603. The plurality of flow passages 612A-612D are similar to the flow passages discussed above, in that each of the flow passages 612A-612D follows a non-linear path defined by an inlet 614, an outlet 616, and an intermediate portion 618 disposed between the inlet 614 and the outlet 616. In this example, the inlets 614 are disposed outside of the nozzle body 602, such that the inlets 614 are arranged to be immediately adjacent to and in fluid communication with a respective entrance port. Meanwhile, the outlets 616 are disposed within the nozzle body 602 and immediately adjacent to and in fluid communication with the single chamber 648, which is in turn in fluid communication with the exit opening 650. Thus, each of the flow passages 612A-612D is configured to provide fluid communication between the respective entrance port and the exit opening 650.

As illustrated in FIG. 7, the non-linear path followed by the flow passage 612A has a first distance and the non-linear path followed by the flow passage 612B has a second distance that is different from the first distance. Thus, the flow passage 612A provides fluid to the chamber 648 at a first pressure and the flow passage 612B provides fluid to the chamber 648 at a second pressure (which is different from the first pressure when the inlet of the flow passage 6126 is partially opened). Similarly, the non-linear path followed by the flow passage 612C has a third distance and the non-linear path followed by the flow passage 612D has a fourth distance that is different from the third distance. Thus, the flow passage 612C provides fluid to the chamber 648 at a third pressure and the flow passage 612D provides fluid to the chamber 648 at a fourth pressure (the fourth pressure may be different than the third pressure when the inlet of the flow passage 612D is partially opened). The third pressure may be equal to or different than the first and second pressures, depending on whether the flow passages are fully or partially opened. Likewise, the fourth pressure may be equal to or different than the first and second pressures, depending on whether the flow passages are fully or partially opened.

Figure 8:
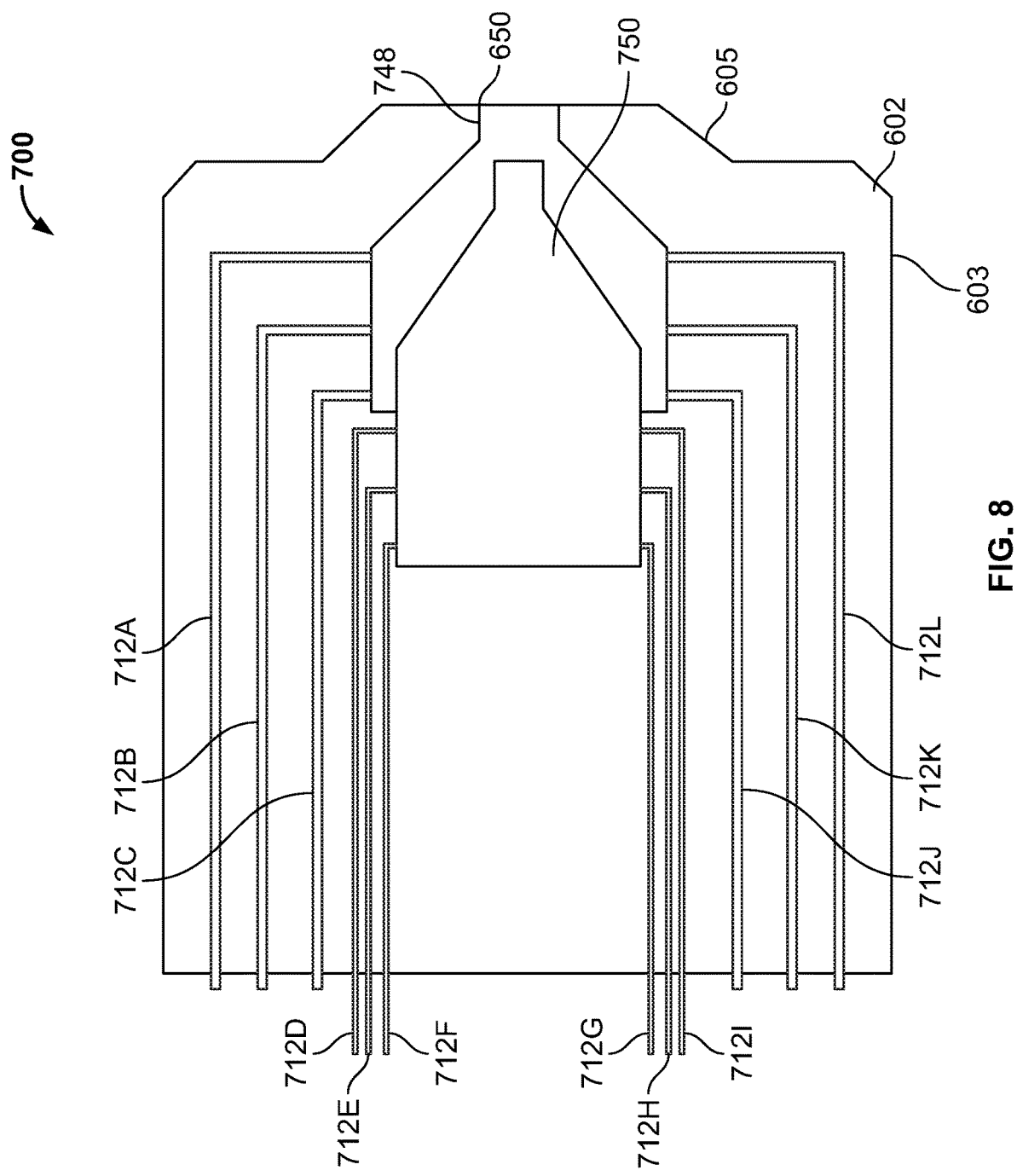
FIG. 8 is a cross-sectional view of yet another example of a nozzle constructed in accordance with a fourth disclosed example of the present invention.

FIG. 8 illustrates another example of a spray nozzle 700 constructed in accordance with a fourth disclosed example of the present invention. The spray nozzle 700 is similar to the spray nozzle 600, with common components depicted using common reference numerals, but is different in several ways. First, the spray nozzle 700 includes additional and differently arranged flow passages 712A-712L, each of which follows a non-linear path. However, as illustrated, the non-linear path followed by the flow passages 712A-712C has a different distance than the non-linear path followed by the flow passages 712D-712F, and the non-linear path followed by the flow passages 712G-712I has a different distance than the non-linear path followed by the flow passages 712J-712L. Second, while each of the flow passages 712A-712L has an inlet that is positioned outside of the nozzle body 602, the inlets of the flow passages 712D-712I terminate at a different position than the inlets of the other flow passages 712A-712C and 712J-712L. More particularly, the inlets of the flow passages 712D-712I are positioned further outward from the nozzle body 600 than the inlets of the other flow passages 712A-712C and 712J-712L. Third, the spray nozzle 700 has two chambers instead of a single chamber (as the spray nozzle 600 has). In particular, the spray nozzle 700 has a first chamber 748 and a second chamber 750 that is distinct from but in fluid communication with the first chamber 748. In this example, the first and second chambers 748, 750 are formed in the nozzle body 602 such that the first and second chambers 748, 750 are co-axial with one another and the second chamber 750 is concentrically arranged within the first chamber 748. In other examples, however, the first and second chambers 748, 750 can be arranged differently. As an example, the second chamber 750 need not be concentrically arranged within the first chamber 748. The first chamber 748 is similar to the chamber 648, in that the first chamber 748 terminates at and is in fluid communication with the exit opening 650. The first chamber 748 is also fluidly connected to the outlets of flow passages 712A-712C and 712J-712L, such that fluid flowing through these flow passages is directed to the first chamber 748 and, ultimately, the exit opening 650. Meanwhile, the second chamber 750 is fluidly connected to the outlets of flow passages 712D-712I, such that fluid flowing through these flow passages is directed to the second chamber 750, then the first chamber 748, and finally the exit opening 650.

Figure 9:
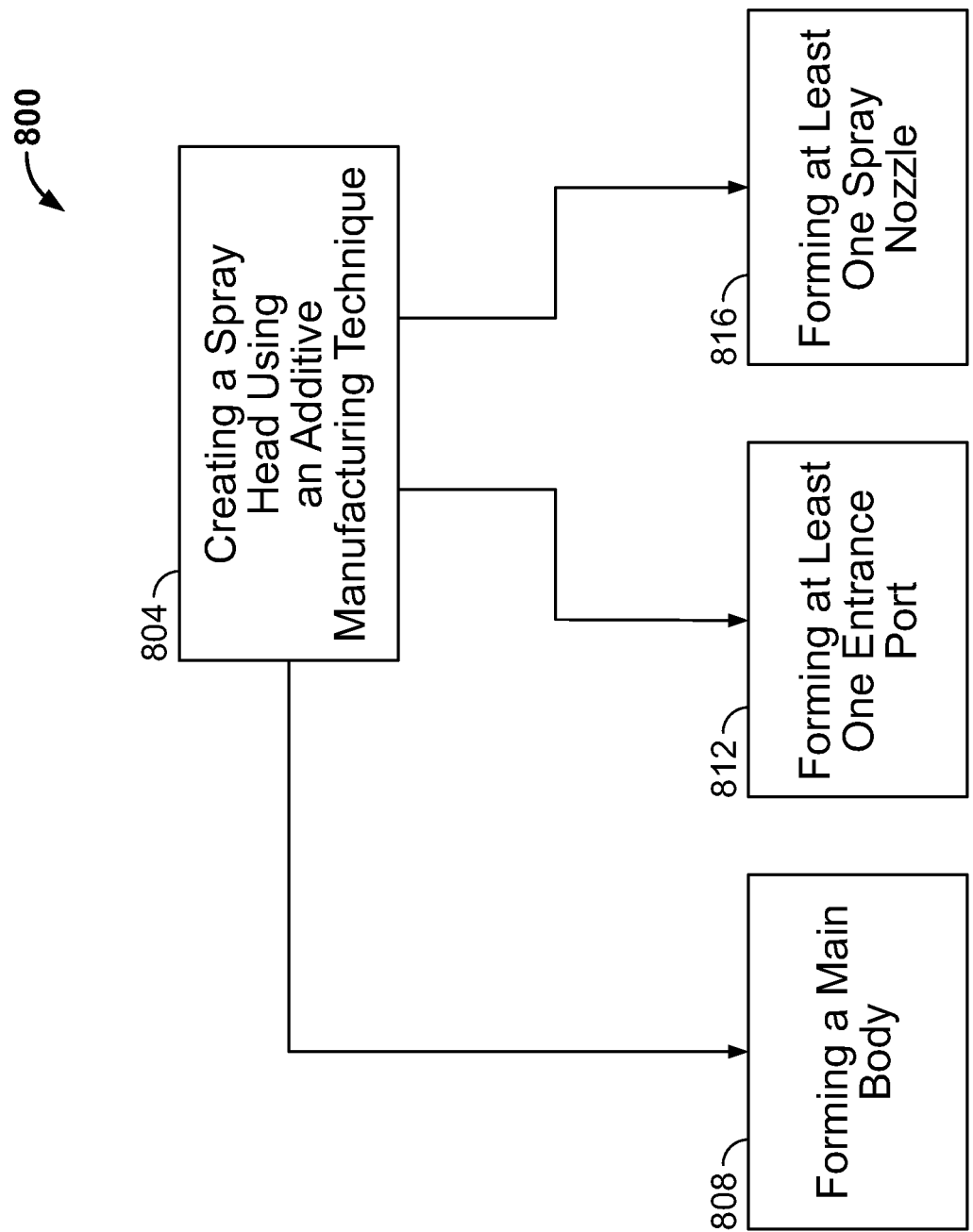
FIG. 9 is a flow diagram depicting an example of a method for manufacturing spray heads according to the teachings of the present disclosure.

FIG. 9 is a flow diagram depicting an example method 800 for manufacturing a spray head (e.g., the spray head 200, the spray head 400) in accordance with the teachings of the present disclosure. In this example, the method 800 includes creating the spray head for a desuperheater (e.g., the desuperheater 104) using an additive manufacturing technique (block 804). The act of creating the spray head includes, in no particular order, (1) forming a main body (e.g., the main body 204) of the spray head having an exterior surface (e.g., the outer wall 237) and defining a central passage (e.g., the passage 240) that extends along a longitudinal axis (e.g., the longitudinal axis 244), the main body adapted for connection to a source of fluid (block 808), (2) forming at least one entrance port (e.g., the entrance port 208) in the main body along the central passage (block 812), (3) forming at least one spray nozzle (e.g., nozzles 212A-212J) arranged adjacent the exterior surface of the main body (block 816), the spray nozzle having at least one exit opening (e.g., the exit opening 250) and a plurality of flow passages (e.g., flow passages 216A-216J) that provide fluid communication between the entrance port and the exit opening of the spray nozzle, wherein a first one of the plurality of flow passages follows a first non-linear path and has a first distance, and wherein a second one of the plurality of flow passages follows a second non-linear path and has a second distance that is different than the first distance. As used herein, the term additive manufacturing technique refers to any additive manufacturing technique or process that builds three-dimensional objects by adding successive layers of material on a material (e.g., a build platform). The additive manufacturing technique may be performed by any suitable machine or combination of machines. The additive manufacturing technique may typically involve or use a computer, three-dimensional modeling software (e.g., Computer Aided Design, or CAD, software), machine equipment, and layering material. Once a CAD model is produced, the machine equipment may read in data from the CAD file (e.g., a build file) and layer or add successive layers of liquid, powder, sheet material (for example) in a layer-upon-layer fashion to fabricate a three-dimensional object. The additive manufacturing technique may include any of several techniques or processes, such as, for example, a stereolithography ("SLA") process, a fused deposition modeling ("FDM") process, multi-jet modeling ("MJM") process, a selective laser sintering or selective laser melting process ("SLS" or "SLM", respectively), an electronic beam additive manufacturing process, and an arc welding additive manufacturing process. In some embodiments, the additive manufacturing process may include a directed energy laser deposition process. Such a directed energy laser deposition process may be performed by a multi-axis computer-numerically-controlled ("CNC") lathe with directed energy laser deposition capabilities.

Figure 10:
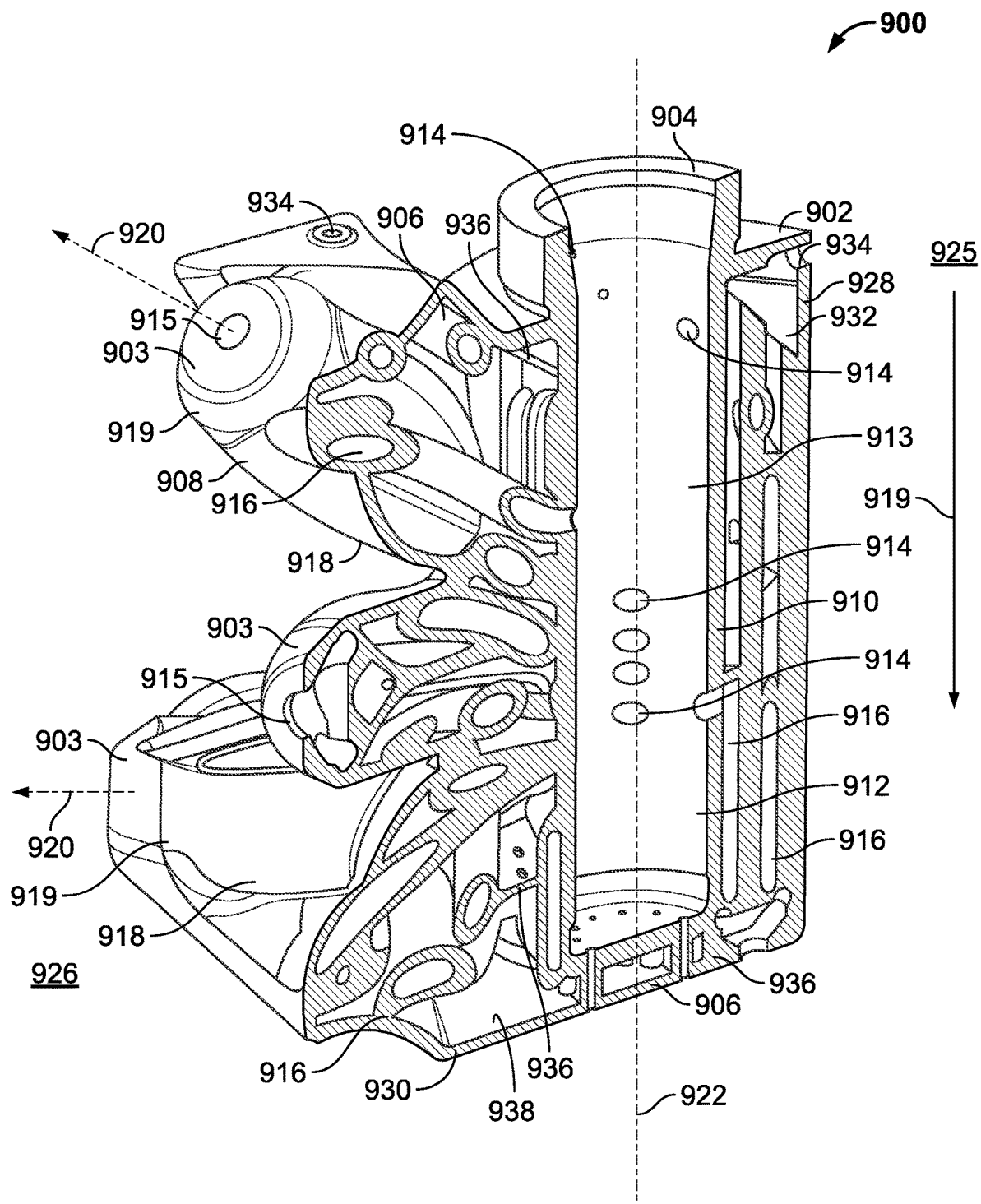
FIG. 10 illustrates an isometric cross-sectional view of another example of a spray head for a desuperheater constructed in accordance with a fifth disclosed example of the present invention.

FIG. 10 illustrates an isometric cross-sectional view of another example of a spray head 900 for a desuperheater constructed in accordance with a fifth disclosed example of the present invention. The spray head 900 may be used with the desuperheater 104 of FIG. 1 in place of the spray head 108 or in connection with other desuperheaters or other flow lines.

In the example shown, the spray head 900 includes a main body 902 and a plurality of spray nozzles 903. The main body 902 includes a first end portion 904 and a second end portion 906. The main body 902 also includes an outer portion 908 and an internal portion 910. The internal portion 910 defines an internal passage 912 that extends between the first end portion 904 and the second end portion 906. The internal portion 910 also includes an internal surface 913. The internal passage 912 may be adapted to be connected to a fluid source. In the example shown, a plurality of entrance ports 914 are formed through the internal portion 910 and are connected to the internal passage 912. The internal surface 913 includes the entrance ports 914.

Each of the nozzles 903 has a corresponding exit port 915. At least some of the entrance ports 914 are formed by the outer portion 908. In the example shown, the outer portion 908 has an irregular shape. For example, a cross-section of the main body 902 between the first and second end portions 904, 906 is not consistent. A plurality of flow passages 916 are also provided. Each flow passage 916 is coupled between one of the entrance ports 914 and a corresponding exit port 915 of a corresponding nozzle 903. Thus, the flow passages 916 extend between the internal surface 913 and the outer portion 908. The flow passages 916 are adapted to flow fluid from the internal passage 912 to the nozzle 903. In the example shown, the entrance ports 914 do not overlap. As a result, one entrance port 914 may flow fluid to one exit port at a time providing for enhanced fluid control.

In the example shown, the main body 902, the spray nozzles 903, and the flow passages 916 are integrally formed. The spray head 900 may be formed using an additive manufacturing technique. If an additive manufacturing technique is used to produce the spray head 900, the flow passages 916 may be used as support structures for the internal passage 912 as the spray head 900 is formed. Using the flow passages 916 as support structures as compared to using conventional support structure techniques may reduce the weight, the build time, and the manufacturing cost of the spray head 900. If the flow passages 916 were not used as support structures, additional support structures may be provided during the additive manufacturing process that may be removed after the manufacturing process. Other manufacturing techniques may prove suitable. Forming the spray head 900 of more than one part that are later coupled may prove suitable.

In the example shown, lobes 918 are provided on the outer portion 908 between at least some of the nozzles 903. The nozzles 903 are shown being carried by outwardly extending protrusions 919. The outer portion 908 and, specifically, the lobes 918/nozzles 903 and the protrusions 919 may be adapted to cause turbulence within the steam flowing through the flow line 102 of FIG. 1. The outer portion 908 may also deter an eigenfrequency of the spray head 900 from being satisfied. If the eigenfrequency is satisfied in, for example, a high-speed flow, the structural integrity of the spray head 900 may be compromised.

When fluid is ejected from the nozzles 903, the fluid is ejected into a turbulent flow. Advantageously, ejecting fluid into turbulent flow may reduce the droplet size of the ejected fluid. Ejecting fluid from the nozzles 903 may also create turbulence within the flow in the flow line 102 and may allow the ejected fluid to evaporate more quickly. By evaporating the ejected fluid more quickly, the likelihood that the ejected fluid is deposited on an inner surface of the flow line 102 is reduced. Corrosion may form on the inner surface of the flow line 102 if fluid is deposited thereon. Conventionally, an expensive protective layer is provided on the inner surface of the flow line 102 to deter corrosion. With the ejected fluid being less likely to be deposited on the inner surface of the flow line 102, a thickness of the expensive protective layer on the inner surface of the flow line 102 may be reduced.

The turbulence within the steam may allow the fluid ejected from the nozzles 903 to have relative movement/velocity to the steam in the flow line 102. The relative movement between the ejected fluid and the steam may allow the ejected fluid to evaporate more quickly. If flow within the flow line 102 were not turbulent, the ejected droplets may accelerate due to the low weight of the droplets, relative movement may not be present, and the fluid may evaporate more slowly.

Ejecting the fluid into the turbulent flow may also encourage the ejected fluid to mix more with the steam and encourage the ejected fluid to evaporate more quickly. Moreover, ejecting the fluid into the turbulent flow may encourage homogeneous distribution of the ejected fluid (e.g., the droplets) within the flow line 102.

To control fluid entering the entrance ports 914, a fluid flow control member (such as the fluid flow control member 422) may be movably disposed within the internal passage 912. In an example, as the fluid control member moves in a direction generally indicated by arrow 925, the entrance ports 914 may be sequentially uncovered allowing for fluid to flow through the flow passage 916 and to the corresponding nozzle 903.

In the example shown, each exit port 915 has an exit axis 920. At least some of the exit axes 920 are non-perpendicular relative to a longitudinal axis 922 of the internal passage 912. Some of exit port 915 may be facing upward, downward, to the left, to the right, etc. Other directions may prove suitable.

Ejecting the fluid in different directions may distribute the fluid (e.g., the droplets) in a manner that allows the efficiency of the evaporation process to increase. Ejecting the fluid in different directions may create turbulence in the flow within the flow line 102 and/or may encourage the size of the ejected droplets to be reduced. Other arrangements of the exit port 915 and/or of the nozzles 903 may prove suitable. For example, at least one of the exit axes 920 may be substantially parallel to the longitudinal axis 922 of the internal passage 912, allowing some the nozzles 903 to be positioned at the bottom of the spray head 900 and the corresponding exit port 915 to face downward (see, FIG. 12).

The main body 902 includes an upstream side 924 and a downstream side 926. The upstream side 924 of the main body 902 may be oriented to face the opposite direction that the steam is flowing within the flow line 102. The downstream side 926 of the main body 902 may be oriented to face the direction that the steam is flowing within the flow line 102. Other orientations of the spray head 900 within the flow line 102 may prove suitable. In the example shown, a majority of the nozzles 903 are disposed adjacent the downstream side 926.

In the example shown, the internal passage 912 is positioned closer to the upstream side 924 of the main body 902 than the downstream side 926 of the main body 902. The off-set orientation of the internal passage 912 (being closer to the upstream side 924) allows the steam to impact and flow over a curved upstream surface 928 of the main body 902 on the downstream side 926 prior to encountering the outer portion 908 of the main body 902. The curved upstream surface 928 is contiguous with the outer portion 908.

At least some of the entrance ports 914 are positioned on the upstream side 924 of the main body 902. Flow passages 916 are coupled between the upstream entrance ports 914 and one or more of the downstream nozzles 903. One or more of the flow passages 916 may wrap about the internal portion 910 from the upstream entrance ports 914 to the downstream nozzles 903. Providing the spray head 900 with the upstream entrance ports 914 allows the spray head 900 to include more nozzles 903 as compared to if the entrance ports 914 were only included on the downstream side 926 of the spray head 900. The entrance ports 914 may be positioned 360° about the internal portion 910.

One or more of the entrance ports 914 may be positioned adjacent the first end portion 904 of the main body 902 and a corresponding spray nozzle 903 may be positioned adjacent the second end portion 906 of the main body 902. Thus, one or more entrance ports 914 may be closer to the first end portion 904 of the main body 902 than the second end portion 906 and the corresponding spray nozzle 903 may be positioned closer to the second end portion 906 of the main body 902 than the first end portion 904. At least some of the flow passages 916 extend relative to the internal passage 912 of the internal portion 910 between the entrance ports 914 closer to the first end portion 904 and the nozzles 903 closer to the second end portion 906.

The main body 902 includes an exterior wall 930 that includes the outer portion 908. The exterior wall 930 may be referred to as an outer wall. The exterior wall 930 surrounds the internal portion 910 on the upstream side 924 of the main body 902. One or more of the flow passages 916 are positioned between the exterior wall 930 and the internal portion 910.

The exterior wall 930 is spaced from the internal portion 910. The spacing between the exterior wall 930 and the internal portion 910 may allow the exterior wall 930 to be thinner. Having a thinner exterior wall 930 may allow the temperature of the exterior wall 930 to be relatively constant. Also, spacing the exterior wall 930 and the internal portion 910 may allow a majority of the exterior wall 930 to be effectively decoupled from the internal portion 910. This decoupling may also allow the temperature of the exterior wall 930 to be relatively constant. Having a thinner exterior wall 930 may increase the quality of the spray head 900 and may reduce the stress imparted on the spray head 900 during use. As an example, having the thinner exterior wall 930 may allow for an additive manufacturing technique to performed during which smaller melt pools may be used and the risk of cracking the exterior wall 930 may be reduced.

In the example shown, an internal space 932 is formed between the exterior wall 930 and the internal portion 910. The internal space 932 may include hollow portions. The internal space 932 may allow the temperature of the exterior wall 930 to remain relatively constant. Providing the spray head 900 with the internal space 932 and, specifically, the hollow portions may reduce manufacturing time and cost. Also, providing the spray head 900 with the hollow portions may reduce the weight of the spray head 900.

The flow passages 916 are positioned within the internal space 932. Some of the flow passages 916 take a non-linear path/convoluted path. The path taken by the flow passages 916 may allow more flow passages 916 to feed more nozzles 903 than if the flow passages 916 radially extended perpendicularly from the longitudinal axis 922 of the internal passage 912. The internal space 932 and the shape of the exterior wall 930 may provide additional space within the spray head 900 for routing the flow passage 916. As a result, the spray head 900 may include a greater number of nozzles 903 than conventional spray heads.

The exterior wall 930 may include through holes 934. The through hole may fluidly couple the internal space 932 and an external environment. The through holes 934 may be used to remove three-dimensional (3-D) material (e.g., powder) from within the spray head 900. The through holes 934 may also be used to allow the pressure within the spray head 900 to equalize when, for example, the fluid flow control member 422 moves within the internal passage 912.

Supports 936 may be coupled between the internal portion 910 and an internal surface 938 of the exterior wall 930. The supports 936 may reinforce the main body 902 and may reinforce the coupling between the internal portion 910 and the exterior wall 930. Supports 936 may be provided between the internal portion 910 and one or more of the flow passages 916.

One or more of the spray nozzles 903 may be different sizes than others of the spray nozzles 903. As an example, some of the spray nozzles 903 may be larger and some of the spray nozzles 903 may be smaller. The larger spray nozzles 903 may have a larger diameter than the smaller spray nozzles 903. The larger spray nozzles 903 may be configured to emit a higher volume of fluid and the smaller spray nozzles 903 may be configured to emit a smaller volume of fluid. The exit ports 915 of the larger spray nozzles 903 may be positioned to spray directly into higher turbulent areas of the flow line 102 to allow the ejected fluid to evaporate faster. The larger nozzles 903 may be pointed in different directions to allow better droplet distribution. The smaller nozzles 903 may be pointed in different directions to encourage droplet distribution. Other orientations of the nozzles 903 may prove suitable.

The entrance ports 914 coupled to the larger spray nozzles 903 may be positioned closer to the second end portion 906 and the smaller spray nozzles 903 may be positioned closer to the first end portion 904. Thus, fluid may be fed to the smaller spray nozzles 903, via the corresponding entrance ports 914, when the fluid flow control member 422 is positioned closer to the first end portion 904 and fluid may be fed to the smaller and larger spray nozzles 903, via the corresponding entrance ports 914, when the fluid flow control member 422 is positioned closer to the second end portion 906. Other positions of the entrance ports 914 may prove suitable.

The larger spray nozzles 903 may be used during a start-up procedure when a larger amount of fluid from the spray head 900 is typically used. The smaller nozzles 903 may be used during normal operation when a smaller or more precise/controlled amount of fluid from the spray head 900 is typically used. In some conventional systems, multiple spray heads may be provided where one of the spray heads includes the larger nozzles and the other one of the spray heads includes the smaller nozzles. This conventional approach adds cost because it requires at least one additional spray head. Thus, the disclosed examples allow for a single spray head 900 to be used for both start-up operations and normal operations.

Figure 11:
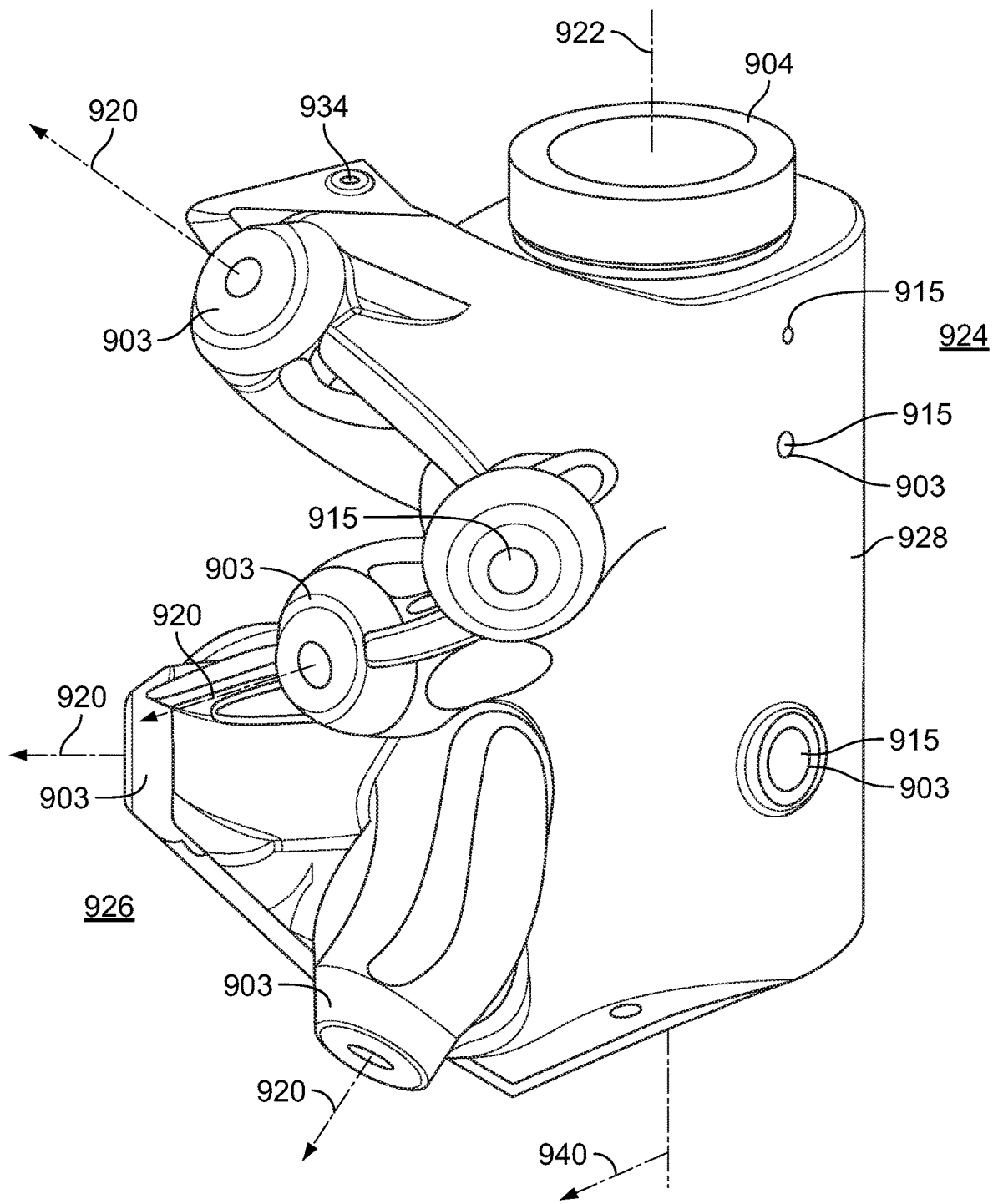
FIG. 11 illustrates an isometric view of the spray head of FIG. 10.

FIG. 11 illustrates an isometric view of the spray head 900 of FIG. 10. In the example shown, the exit axes 920 and the exit openings 915 of the nozzles 903 are non-parallel relative to reference radii 940 that project from the longitudinal axis 922. Angles between the exit axes 920 and the longitudinal axis 922 may be different. Angles between the exit axes 920 may be different. The orientation of the exit axes 920 may encourage turbulence within the flow, thorough mixing of the ejected fluid within the flow stream, and/or an increase in the rate of evaporation of the ejected fluid. The spray head 900 may be provided with any number of nozzles 903. For example, the spray head 900 may include fifteen nozzles. Another number of nozzles 903 may prove suitable.

Figure 12:
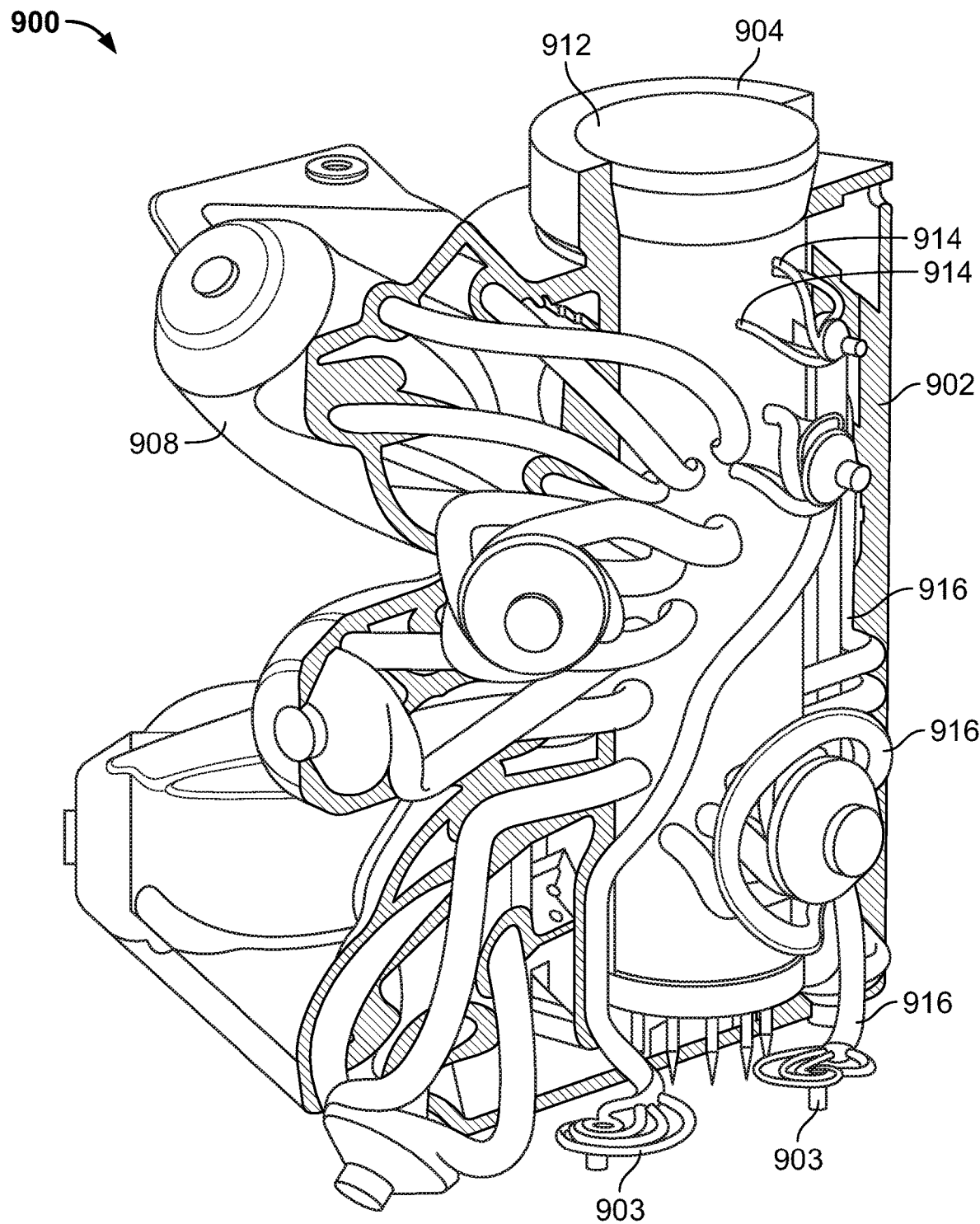
FIG. 12 illustrates an isometric cross-sectional view and negative space within the spray head of FIG. 10.

FIG. 12 illustrates an isometric cross-sectional view and negative space within the spray head 900 of FIG. 10. The negative space shown allows the entrance ports 914, the flow passages 916, and the corresponding nozzles 903 to be shown. The entrance ports 914 may be positioned in a manner to allow different nozzles 903 to be fed water based on the relative position of the fluid flow control member 422 within the internal passage 912. The entrance ports 914 may positioned 360° about the internal passage 912. The flow passages 916 may be routed in a free-form manner between the entrance ports 914 and the nozzles 903 to save space. For example, one or more of the flow passages 916 may wrap about the internal portion 910 and/or be routed in a manner to allow the nozzles 903 to be in different positions.

From the foregoing, it will be appreciated that the above disclosed apparatus, methods and articles of manufacture enable spray heads for use with desuperheaters to be custom produced, using cutting edge manufacturing techniques like additive manufacturing, as a single part that satisfies customer specific designs with less process efforts (e.g., without brazing and other conventional, time intensive manufacturing techniques) and at a cheaper cost as compared to some known spray heads. The spray heads disclosed herein can, for example, be produced with nozzles having any number of customized flow passages having any number of different complex geometries that decrease the footprint of the spray head (or at least decrease the amount of space used by the flow passages), reduce leakage, increase the quality of the discharged atomized fluid (e.g., the spray water) and increase the controllability of the spray heads. As an example, the nozzles can be produced having flow passages with a non-uniform cross-section, thereby reducing pressure loss as the fluid to be atomized flows from the main body of the spray head and out through the nozzle(s) of the spray head via the flow passages. As another example, the nozzles can be produced with independently controllable inlets and one or more chambers (which themselves may be independent from one another). As a result of providing independent inlets, the pressure of each of the inlets can be independently controlled based on, for example, the geometry (e.g., cross-sections) of the different flow passages, when the inlet is not fully opened (i.e., the inlet is only "partially opened"). Put another way, flow characteristics of the fluid flowing through the inlets can be similar to or different from one another based on how the flow passages are structured. For example, a first one of the flow passages can have a geometry that provides fluid at a first pressure to an exit opening of the nozzle and a second one of the flow passages can be structured to provide fluid at a second pressure to the exit opening of the nozzle (the second pressure may be different than the first pressure when one of the inlets of the nozzle is partially opened).

Further, while several examples have been disclosed herein, any features from any examples may be combined with or replaced by other features from other examples. Moreover, while several examples have been disclosed herein, changes may be made to the disclosed examples without departing from the scope of the claims.

What is claimed is:

1. A spray head for a desuperheater, comprising:
   a main body having a first end portion arranged for attachment to a flow line, a second end portion spaced away from the first end portion, an internal surface, an outer portion, and an internal passage defined by the internal surface, the internal passage arranged for connection to a fluid source, and the internal surface having a plurality of entrance ports;
   a plurality of spray nozzles, each of the plurality of spray nozzles including an exit port;
   a plurality of flow passages extending between the internal surface and the outer portion, each of the plurality of flow passages fluidly coupling a corresponding one of the plurality of entrance ports to a corresponding exit port of a corresponding one of the plurality of spray nozzles;
   a plurality of outwardly extending projections integrally formed with the main body such that the main body and the plurality of outwardly extending projections form a monolithic structure, the plurality of outwardly extending projections extending away from a longitudinal axis of the main body; and
   wherein each of the spray nozzles is carried by one of the outwardly extending projections.

2. The spray head of claim 1, wherein a first one of the exit ports is oriented along a first axis and at a first angle relative to the longitudinal axis, and a second one of the exit ports is oriented along a second axis at an angle relative to the first axis and at a second angle relative to the longitudinal axis, the first and second angles being different from one another.

3. The spray head of claim 1, wherein a first one of the exit ports is oriented along a first axis and parallel to the longitudinal axis.

4. The spray head of claim 1, wherein the main body includes an upstream side and a downstream side, and wherein a majority of the spray nozzles are disposed adjacent the downstream side.

5. The spray head of claim 4, wherein at least some of the entrance ports are positioned adjacent the upstream side.

6. The spray head of claim 1, wherein the main body includes an upstream side and a downstream side, and wherein a first one of the entrance ports is adjacent the upstream side and the corresponding exit port is adjacent the downstream side.

7. The spray head of claim 1, wherein the entrance port is positioned adjacent the first end portion and a corresponding spray nozzle is positioned adjacent the second end portion.

8. The spray head of claim 1, wherein the outer portion surrounds the internal passage, and the flow passages are disposed between the outer portion and the internal passage.

9. The spray head of claim 1, wherein an internal space is formed by the outer portion and the flow passages are positioned within the internal space.

10. The spray head of claim 9, wherein the outer portion defines a through hole fluidly coupling the internal space to an external environment.

11. The spray head of claim 1, further comprising a support coupled between the internal passage and an internal surface of the outer portion.

12. The spray head of claim 1, wherein the outer portion of the main body has an irregular external shape.

13. The spray head of claim 12, wherein the main body has an upstream side and a downstream side, the entrance port positioned on the upstream side of the main body, and wherein a majority of the spray nozzles are disposed adjacent the downstream side.

14. The spray head of claim 12, wherein the main body, the spray nozzle, and the flow passages are integrally formed.

15. The spray head of claim 12, wherein the main body has a curved upstream surface that is contiguous with the outer portion having the irregular external shape.

16. The spray head of claim 1, wherein the outwardly extending projections are integrally formed with and extend radially outwardly from the outer portion of the main body.

17. A spray head for a desuperheater, comprising:
a main body having a first end portion arranged for attachment to a flow line, a second end portion spaced away from the first end portion, an internal surface, and an internal passage defined by the internal surface, the internal passage arranged for connection to a fluid source, the internal surface having a plurality of entrance ports;
the main body including an outer portion and including a plurality of spray nozzles, each of the plurality of spray nozzles including an exit port; and
a plurality of flow passages extending between the internal surface and the outer portion, each of the plurality of flow passages fluidly coupling a corresponding one of the plurality of entrance ports to a corresponding exit port of a corresponding one of the plurality of spray nozzles,
wherein each of the spray nozzles is carried by an outwardly extending projection that extends away from a longitudinal axis of the main body, and
wherein a first one of the spray nozzles adapted to spray a first volume of the fluid is positioned closer to the second end portion, and a second one of the spray nozzles adapted to spray a second volume of the fluid is positioned closer to the first end portion, the first volume being greater than the second volume.

18. A spray head for a desuperheater, comprising:
a main body having a first end portion arranged for attachment to a flow line, a second end portion spaced away from the first end portion, an internal surface, and an internal passage defined by the internal surface, the internal passage arranged for connection to a fluid source, and the internal surface having a plurality of entrance ports;
the main body including an outer portion and including a plurality of spray nozzles, each of the plurality of spray nozzles including an exit port; and
a plurality of flow passages extending between the internal surface and the outer portion, each of the plurality of flow passages fluidly coupling a corresponding one of the plurality of entrance ports to a corresponding exit port of a corresponding one of the plurality of spray nozzles,
wherein each of the spray nozzles is carried by an outwardly extending projection that extends away from a longitudinal axis of the main body, and
wherein a first one of the exit ports is oriented along a first axis and at a first angle relative to the longitudinal axis, and a second one of the exit ports is oriented along a second axis at an angle relative to the first axis and at a second angle relative to the longitudinal axis, the first and second angles being different from one another.

19. A spray head for a desuperheater, comprising:
a main body having a first end portion arranged for attachment to a flow line, a second end portion spaced away from the first end portion, an internal surface, and an internal passage defined by the internal surface, the internal passage arranged for connection to a fluid source, and the internal surface having a plurality of entrance ports;
the main body including an outer portion and including a plurality of spray nozzles, each of the plurality of spray nozzles including an exit port; and
a plurality of flow passages extending between the internal surface and the outer portion, each of the plurality of flow passages fluidly coupling a corresponding one of the plurality of entrance ports to a corresponding exit port of a corresponding one of the plurality of spray nozzles,
wherein each of the spray nozzles is carried by an outwardly extending projection that extends away from a longitudinal axis of the main body, and
wherein a first one of the exit ports is oriented along a first axis and parallel to the longitudinal axis.

20. A method of manufacturing, comprising:
creating a spray head for a desuperheater using an additive manufacturing technique, the creating comprising:
forming a main body having a first end portion arranged for attachment to a flow line, a second end portion spaced away from the first end portion, an internal surface, an outer portion, and an internal passage defined by the internal surface, the internal passage arranged for connection to a fluid source, the internal surface having a plurality of entrance ports;
forming a plurality of spray nozzles, each of the plurality of spray nozzles including an exit port; and
forming a plurality of flow passages extending between the internal surface and the outer portion, each of the plurality of flow passages fluidly coupling a corresponding one of the plurality of entrance ports to a corresponding exit port of a corresponding one of the plurality of spray nozzles; and
integrally forming a plurality of outwardly extending projections with the main body such that the main body and the plurality of outwardly extending projections form a monolithic structure, the plurality of outwardly extending projections extending away from a longitudinal axis of the main body;
wherein each of the spray nozzles is carried by one of the outwardly extending projections, and
wherein a first one of the spray nozzles adapted to spray a first volume of the fluid is positioned closer to the second end portion, and a second one of the spray nozzles adapted to spray a second volume of the fluid is positioned closer to the first end portion, the first volume being greater than the second volume.

21. The method of claim 20, wherein a first one of the exit openings is oriented along a first axis and at a first angle relative to the longitudinal axis, and a second one of the exit openings is oriented along a second axis at an angle relative to the first axis and at a second angle relative to the longitudinal axis, the first and second angles being different from one another.

* * * * *

UNITED STATES PATENT AND TRADEMARK OFFICE
CERTIFICATE OF CORRECTION

| | | |
|---|---|---|
| PATENT NO. | : 11,454,390 B2 | Page 1 of 1 |
| APPLICATION NO. | : 16/702114 | |
| DATED | : September 27, 2022 | |
| INVENTOR(S) | : Marc Oliver Huber et al. | |

It is certified that error appears in the above-identified patent and that said Letters Patent is hereby corrected as shown below:

On the Title Page

At item (72), Line 1, "Marc Oliver Huber," should be -- Marc Huber, --.

In the Specification

At Column 6, Line 16, "2128." should be -- 212B. --.

At Column 8, Line 33, "4128," should be -- 412B, --.

At Column 8, Line 34, "4128" should be -- 412B --.

At Column 9, Line 18, "6126" should be -- 612B --.

At Column 10, Lines 56-57, "selective laser melting process ("SLS" or "SLM", respectively))," should be -- selective laser sintering or selective laser melting ("SLS" or "SLM", respectively) process, --.

At Column 10, Lines 62-63, "computer-numerically-controlled ("CNC")" should be -- computer numerical control ("CNC") --.

At Column 12, Line 48, "some the" should be -- some of the --.

At Column 13, Lines 50-51, "to performed" should be -- to be performed --.

At Column 15, Lines 17-18, "may positioned" should be -- may be positioned --.

Signed and Sealed this
Fourteenth Day of November, 2023

*Katherine Kelly Vidal*

Katherine Kelly Vidal
*Director of the United States Patent and Trademark Office*